April 22, 1952　　R. C. LAUTERWASSER　　2,594,038
FISHING LURE
Filed Sept. 9, 1949

INVENTOR.
R　C. Lauterwasser
BY
Attorney.

Patented Apr. 22, 1952

2,594,038

UNITED STATES PATENT OFFICE 2,594,038

FISHING LURE

Robert C. Lauterwasser, Ludington, Mich.

Application September 9, 1949, Serial No. 114,777

4 Claims. (Cl. 43—42.52)

This invention relates to improvements in fishing lures.

The main objects of this invention are:

First, to provide a fishing lure of the spoon type which has zigzag and wobbling or rocking movement when propelled through the water which is effective in attracting fish.

Second, to provide a fishing lure of this spoon type which is well adapted for use as a casting lure.

Other objects and advantages relating to details of my invention will be apparent from a consideration of the following description and claims.

A preferred embodiment of the invention is illustrated in the accompanying drawing in which.

Figure 1:
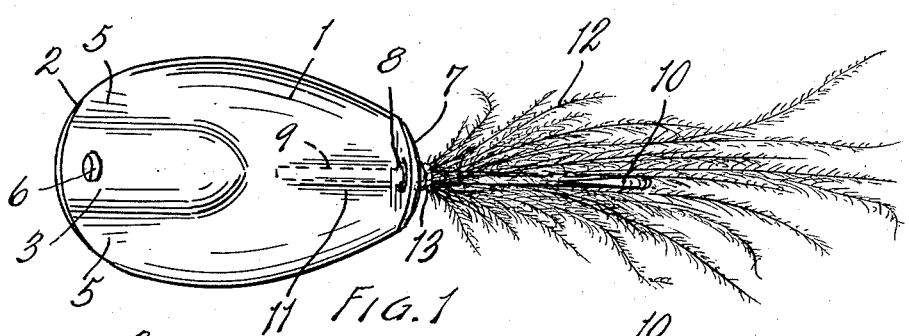
Fig. 1 is a plan view of a lure embodying my invention.
Figure 2:
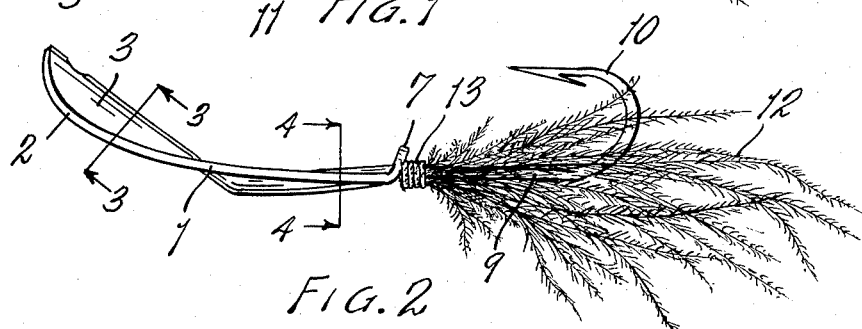
Fig. 2 is a side elevational view thereof.
Figure 3:
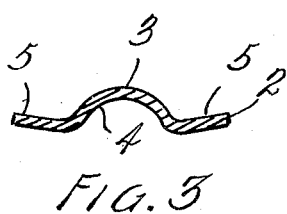
Fig. 3 is a transverse section on a line corresponding to line 3—3 of Fig. 2.

The lure of my invention is well adapted as a casting lure and in the accompanying drawing it is shown much enlarged as compared to sizes desirable for use as casting lures. The embodiment of my invention illustrated comprises a generally oval concavo convex rearwardly tapered body 1, the front portion 2 which is upwardly inclined. This upwardly inclined portion has a central longitudinally extending upward offset portion 3 of substantial length and width resulting in a forwardly inclined, downwardly facing channel 4 and flange-like side portions 5. This upwardly offset portion has a central line attaching eye 6.

Figure 4:
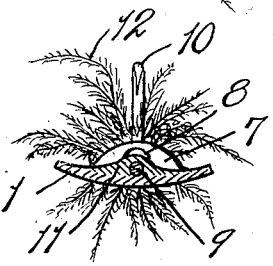
Fig. 4 is a transverse section on a line corresponding to line 4—4 of Fig. 2.

The rear end of the body terminates in an upturned flange 7, this flange being at a fairly sharp angle to the body. The flange has a hole 8 therein through which the shank 9 of the hook 10 is disposed. The shank 9 is secured on the upper side of the body desirably by means of solder 11 which is symmetrically arranged as shown in Fig. 4. The hook and the solder serve to weight the body and this in coaction with the upturned end and the greater width of the front end of the body results in the body taking a rearwardly inclined position when it is drawn through the water. The channel and the flange-like portions coact in producing a wobbling or rocking and side to side zigzagging motion simulating swimming as the lure is drawn through the water. The feathers or filaments 12 are secured to the shank of the hook by wrapping as at 13, the filaments being secured closely adjacent the upturned flange 7 which serves as a guard for the fastening.

At least the underside of the bait is, when made of metal, desirably plated or otherwise finished to produce a reflecting surface which adds to its attractiveness. As stated, baits embodying my invention are highly efficient. My invention is particularly desirable when embodied in small sizes to be used as in fly casting although the size may be varied greatly according to the purpose for which the bait is intended.

I claim:

1. A fishing lure comprising, a body of a generally oval outline with its large end disposed forwardly and inclined upwardly and with the opposite side edge portions of the body inclined upwardly throughout substantially the entire length of the body, the large upwardly inclined forward portion having a central longitudinally extending upward offset of substantial length and width providing a forwardly inclined downwardly facing channel, and flange-like portions projecting laterally for a substantial distance from opposite sides of the central offset closely adjacent the forward end of said central offset, said flange-like portions constituting the forward ends of said upwardly inclined opposite side edge portions of the body, said upward offset having a central line attaching opening at its front end, the rear end of the body terminating in an upturned flange having a centrally positioned opening therein, a hook having its shank projecting through said opening and above said body, said shank having a fused integral-like connection to the upper side of the body, and filament secured to the shank of the hook at the rear of and closely adjacent to the upturned flange which flange constitutes a guard for the filament securing means.

2. A fishing lure comprising, a body of a generally oval outline with its large end disposed forwardly and inclined upwardly and with the opposite side edge portions of the body inclined upwardly throughout substantially the entire length of the body, the large upwardly inclined forward portion having a central longitudinally extending upward offset of substantial length and width providing a forwardly inclined downwardly facing channel, and flange-like portions at each side thereof, said flange-like portions constituting the forward ends of said upwardly including opposite edge portions of the body, said upward offset having a central line attaching opening at its front end, the rear end of the body terminating in an upturned flange having a centrally positioned opening therein, and a hook having its shank projecting through said opening and above said body, said shank having a fused integral-like connection to the upper side of the body.

3. A fishing lure comprising, a body of a generally oval outline with its large end disposed forwardly and inclined upwardly and with the opposite side edge portions of the body inclined upwardly throughout substantially the entire length of the body, the large upwardly inclined forward portion having a central longitudinally extending upward offset of substantial length and width providing a forwardly inclined downwardly facing channel, and flange-like portions at each side thereof, said flange-like portions constituting the forward ends of said upwardly inclined opposite side edge portions of the body, said upward offset having a central line attaching opening at its front end, and a hook having its shank disposed above said body, said shank having a fused integral-like connection to the upper side of the body.

4. A fishing lure comprising a body of a generally oval outline with its large end disposed forwardly and inclined upwardly and with the opposite side edge portions of the body inclined upwardly throughout substantially the entire length of the body, the large upwardly inclined forward portion having a central longitudinally extending upward offset of substantial length and width providing a forwardly inclined downwardly facing channel and flange-like portions projecting laterally for a substantial distance from opposite sides of the central offset closely adjacent the forward end of said central offset, said flange-like portions constituting the forward ends of said upwardly inclined opposite side edge portions of the body, said upward offset having a central line attaching opening at its front end, and a hook secured to the rear end of the body.

ROBERT C. LAUTERWASSER.

REFERENCES CITED

The following references are of record in the file of this patent:

UNITED STATES PATENTS

| Number | Name | Date |
| --- | --- | --- |
| 962,319 | Crosby | June 21, 1910 |
| 1,905,407 | Best | Apr. 25, 1933 |
| 2,164,415 | Mallett | July 4, 1939 |
| 2,238,292 | Schavey | Apr. 15, 1941 |
| 2,280,197 | Ounsworth | Apr. 21, 1942 |